United States Patent
Gulwani et al.

(10) Patent No.: US 9,659,082 B2
(45) Date of Patent: May 23, 2017

(54) SEMANTIC QUERY LANGUAGE

(75) Inventors: Sumit Gulwani, Bellevue, WA (US); Geoffrey Gerson Zweig, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/594,883

(22) Filed: Aug. 27, 2012

(65) Prior Publication Data

US 2014/0059078 A1   Feb. 27, 2014

(51) Int. Cl.
*G06F 17/30*   (2006.01)

(52) U.S. Cl.
CPC .. *G06F 17/30657* (2013.01); *G06F 17/30672* (2013.01)

(58) Field of Classification Search
USPC ........................................ 707/758, 769, 772
See application file for complete search history.

(56) References Cited

U.S. PATENT DOCUMENTS

| | | | |
|---|---|---|---|
| 6,567,802 B1 * | 5/2003 | Popa | G06F 17/30463 |
| 7,870,117 B1 | 1/2011 | Rennison | |
| 7,925,498 B1 | 4/2011 | Baker et al. | |
| 2002/0010574 A1 * | 1/2002 | Tsourikov | G06F 17/271 |
| | | | 704/9 |
| 2003/0233224 A1 | 12/2003 | Marchisio et al. | |
| 2005/0005266 A1 * | 1/2005 | Datig | G06F 17/279 |
| | | | 717/136 |
| 2005/0027691 A1 | 2/2005 | Brin et al. | |
| 2005/0043940 A1 | 2/2005 | Elder | |
| 2007/0130112 A1 | 6/2007 | Lin | |
| 2008/0097974 A1 * | 4/2008 | Chen | G06F 17/30926 |
| 2008/0120129 A1 * | 5/2008 | Seubert | G06Q 10/06 |
| | | | 705/35 |
| 2009/0070327 A1 * | 3/2009 | Loeser | G06F 17/30672 |

(Continued)

FOREIGN PATENT DOCUMENTS

CN          1849603 A          10/2006

OTHER PUBLICATIONS

Bull, et al., "Semantic Grep: Regular Expressions + Relational Abstraction", Proceedings of the Ninth Working Conference on Reverse Engineering, IEEE Computer Society, 2002, pp. 1-10.*

(Continued)

*Primary Examiner* — Syed Hasan
*Assistant Examiner* — Ahmed Abraham
(74) *Attorney, Agent, or Firm* — Medley, Behrens & Lewis, LLC (57) ABSTRACT

Various technologies described herein pertain to executing a mixed query to search a database retained in a data repository. The mixed query includes a regular expression, which is a pattern of elements, and a semantic constraint. The elements in the regular expression include a first wildcard, where the semantic constraint restricts a meaning of the first wildcard. Moreover, the elements in the regular expression include explicit lexical constraint(s) and/or disparate wildcard(s). For instance, semantic constraint(s) can restrict meaning(s) of the disparate wildcard(s). The mixed query is executed to retrieve results that match the pattern of the elements in the regular expression and satisfy the semantic constraint(s).

20 Claims, 8 Drawing Sheets

(56) References Cited

U.S. PATENT DOCUMENTS

| | | | | |
|---|---|---|---|---|
| 2009/0271179 | A1* | 10/2009 | Marchisio | G06F 17/30672 704/9 |
| 2009/0292687 | A1* | 11/2009 | Fan | G06F 17/30654 |
| 2011/0179074 | A1* | 7/2011 | Lee | G06F 17/30312 707/769 |
| 2012/0131046 | A1* | 5/2012 | Leshchiner | G06F 17/30442 707/769 |
| 2012/0191716 | A1* | 7/2012 | Omoigui | H01L 27/1463 707/740 |
| 2012/0265779 | A1* | 10/2012 | Hsu | G06F 17/3064 707/767 |
| 2012/0330908 | A1* | 12/2012 | Stowe | G06F 17/30955 707/693 |
| 2013/0254182 | A1* | 9/2013 | Tunstall-Pedoe | G06F 17/30654 707/713 |

OTHER PUBLICATIONS

Riehmann, et al., "The Netspeak WordGraph: Visualizing Keywords in Context", IEEE Pacific Visualization Symposium, Mar. 1-4, 2011, pp. 123-130.*

Valderrabanos, et al., "Automatic Terminology Extraction and Validation: The LIQUID Approach", Retrieved at /www.bitext.com/btxt_papers/ART EN automatic_terminolog_extraction_validation_liquid_approach.pdf>>, Conference and Exhibition, London, Jan. 2001, pp. 1-12.*

Valderrabános, et al., "Automatic Terminology Extraction and Validation: The LIQUID Approach", Retrieved at <<http://www.bitext.com/btxt_papers/ART_EN_automatic_terminolog_extraction_validation_liquid_approach.pdf>>, Conference and Exhibition, London, Jan. 2001, pp. 1-12.

Yih, et al., "Polarity Inducing Latent Semantic Analysis", Retrieved at <<http://research.microsoft.com/apps/pubs/?id=166243>>, Proceedings of Conference on Empirical Methods in Natural Language Processing and Computational Natural Language Learning (EMNLP-CoNLL), Association for Computational Linguistics, Jul. 12, 2012, pp. 1-11.

Zweig, et al., "A Challenge Set for Advancing Language Modeling", Retrieved at <<http://research.microsoft.com/apps/pubs/default.aspx?id=164170>>, Workshop on the Future of Language Modeling for HLT, NAACL-HLT 2012, ACL/SIGPARSE, Jun. 2012, pp. 1-8.

"International Search Report", Mailed Date: Nov. 7, 2013, Application No. PCT/US2013/055893, Filed Date: Aug. 21, 2013, pp. 1-13.

"Office Action for Chinese Patent Application No. 201380045160.1", Mailed Date: Mar. 17, 2017, 16 pages.

* cited by examiner

SEMANTIC QUERY LANGUAGE

BACKGROUND

Regular expressions are commonly utilized to search a database. A regular expression, for instance, can be employed to find text in a database that matches a string of text. Thus, the regular expression can be evaluated to return matching strings of text from the database.

According to an example, a regular expression can be generated to search for the string of text "travel to the store" in a database. Following this example, sentence(s) that include the string of text "travel to the store" can be returned responsive to the foregoing exemplary regular expression. However, when using a regular expression to search a database, strings with similar meanings (e.g., "travel to the market" instead of "travel to the store") are typically missing in the results returned responsive to execution of the regular expression.

SUMMARY

Described herein are various technologies that pertain to executing a mixed query to search a database retained in a data repository. The mixed query includes a regular expression, which is a pattern of elements, and a semantic constraint. The elements in the regular expression include a first wildcard, where the semantic constraint restricts a meaning of the first wildcard. Moreover, the elements in the regular expression include explicit lexical constraint(s) and/or disparate wildcard(s). For instance, semantic constraint(s) can restrict meaning(s) of the disparate wildcard(s). The mixed query is executed to retrieve results that match the pattern of the elements in the regular expression and satisfy the semantic constraint(s). Accordingly, the mixed query can be utilized to search the database for results that match a specified query in meaning.

According to various embodiments, the mixed query can further include syntactic constraint(s) that can restrict grammar of wildcard(s) (e.g., one or more of the first wildcard and the disparate wildcard(s), etc.) included in the regular expression. Accordingly, the mixed query can be executed to retrieve results that match the pattern of the elements in the regular expression and satisfy the semantic constraint(s) and the syntactic constraint(s).

According to some embodiments, results returned responsive to mixed queries can be utilized in various applications. By way of example, the results can be utilized as part of an interactive language tutoring application. Pursuant to yet another example, the results can be employed as part of a question answering application.

In accordance with various embodiments, a mixed query can be iteratively generated. For instance, an initial mixed query can be constructed, and a refined mixed query can iteratively be constructed (e.g., manually by a user, etc.) responsive to results returned for a previous iteration of the mixed query. In accordance with another example, feedback pertaining to results undesirably retrieved in response to a previous query and/or missing results can be utilized to automatically construct a refined mixed query.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to executing a mixed query, which includes a regular expression and semantic constraint(s), to retrieve results from a database retained in a data repository are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "first," "second," and the like are not intended to denote an order. For example, if a regular expression includes a first wildcard and a second wildcard, it is contemplated that the first wildcard can be before or after the second wildcard in the regular expression. Moreover, it is contemplated that other elements can be included between the first wildcard and the second wildcard in the regular expression (e.g., a third wildcard can be between the first wildcard and the second wildcard, etc.). Further, the terms "first," "second," and the like are not intended to limit a number of instances of an item. By way of example, if a regular expression is described as including a first wildcard, it is to be appreciated that such regular expression can include substantially any number of wildcards (e.g., one or more wildcards). Yet, the claimed subject matter is not limited to the foregoing examples.

As set forth herein, a mixed query can be employed to search a database for results that match a specified query in meaning. The mixed query includes a regular expression and semantic constraint(s). The semantic constraint(s) can restrict meanings of wildcard(s) included in the regular expression. The wildcard(s), for instance, can be word wildcard(s) or phrase wildcard(s). The mixed query can be executed to retrieve results that match a pattern of elements in the regular expression and satisfy the semantic constraint(s).

In some conventional approaches, a query can include a regular expression and syntactic constraint(s). The syntactic constraint(s) can pertain to grammatical constructions. For example, a syntactic constraint can restrict a corresponding wildcard included in the regular expression to have a particular part of speech. Following this example, syntactic constraints can be used to specify that a first wildcard in the regular expression is a noun and a second wildcard in the regular expression is a verb.

In contrast to restricting the grammatical construction, semantic constraint(s) included in the mixed queries disclosed herein pertain to meaning. For instance, conventional approaches that use syntactic constraint(s) without semantic constraint(s) can return a syntactically correct sentence that is semantically incorrect. An example of such a sentence is as follows: "Colorless green ideas sleep furiously." In the foregoing sentence, the grammar is correct, whereas the semantics are meaningless.

According to various embodiments set forth herein, a mixed query can include a regular expression, semantic constraint(s), and syntactic constraint(s). As noted above, the semantic constraint(s) can restrict meanings of wildcard(s) included in the regular expression. Further, the syntactic constraint(s) can restrict grammar of wildcard(s) included in the regular expression. For instance, the semantic constraint(s) and the syntactic constraint(s) can restrict the same and/or different wildcard(s). Moreover, the mixed query can be executed to retrieve results that match a pattern of elements in the regular expression and satisfy the semantic constraint(s) and the syntactic constraint(s).

Figure 1:
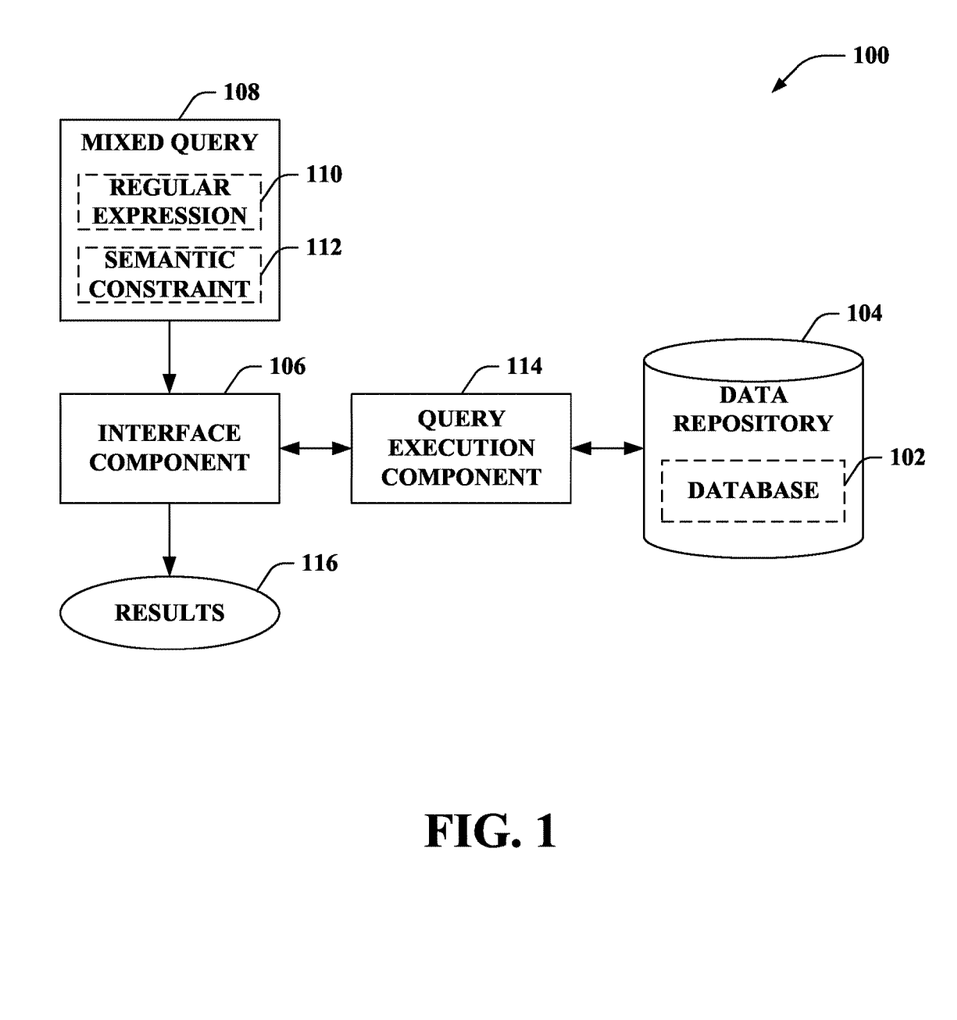
FIG. 1 illustrates a functional block diagram of an exemplary system that searches a database retained in a data repository.

Referring now to the drawings, FIG. 1 illustrates a system 100 that searches a database 102 retained in a data repository 104. The system 100 includes an interface component 106 that receives a mixed query 108. The mixed query 108 includes a regular expression 110 and a semantic constraint 112. Moreover, although not shown, it is contemplated that the mixed query 108 can include other semantic constraint(s) in addition to the semantic constraint 112. Further, although not depicted, it is to be appreciated that the mixed query 108 can include syntactic constraint(s).

The mixed query 108 can be utilized to search the database 102 for sentences that match a specified query in meaning. Accordingly, the mixed query 108 can be formulated with two parts, namely, the regular expression 110 and the constraint(s). The constraints can include semantic constraint(s) (e.g., including the semantic constraint 112) and syntactic constraint(s). The regular expression 110 is to match in results 116 (e.g., matching sentences, etc.) that are returned responsive to the mixed query 108. Moreover, the semantic constraint(s) are restrictions on meanings (e.g., of corresponding wildcards) that are to be met by the results 116 that are returned. Accordingly, the system 100 can use semantic constraint(s) in addition to the regular expression 110 when querying the database 102, thereby enabling the database 102 to be searched for sentences that match a specified query in meaning. Further, if included in the constraint(s), syntactic constraint(s) are restrictions on grammatical construction (e.g., of corresponding wildcards) that are to be met by the results 116 that are returned. Thus, the syntactic constraint(s) can be used by the system 100 when querying the database 102 to search for sentences that match grammatical construction of the specified query.

The regular expression 110 is a pattern of elements. An element, for example, can be a constant word, a constant phrase, a word wildcard, or a phrase wildcard. Moreover, an element can be a constant string of characters other than a constant word or a constant phrase. Yet, it is to be appreciated that the claimed subject matter is not so limited. The pattern of elements in the regular expression 110 can be utilized to identify a set of strings in the database 102.

According to various embodiments, the elements in the regular expression 110 can include a first wildcard. The first wildcard can be a word wildcard or a phrase wildcard. Moreover, the semantic constraint 112 can restrict a meaning of the first wildcard in the regular expression 110. Further, the elements in the regular expression 110 can include explicit lexical constraint(s), disparate wildcard(s), a combination thereof, and the like. An explicit lexical constraint in the regular expression 110 can be a constant word or a constant phrase (or other constant string of characters). Thus, the explicit lexical constraint is an explicit string of characters included in the pattern in the regular expression 110. Moreover, a wildcard in the regular expression 110 can be a word wildcard or a phrase wildcard.

The system 100 also includes a query execution component 114 (e.g., query execution engine) that executes the mixed query 108. The query execution component 114 retrieves results 116 that match the pattern of the elements in the regular expression 110 and satisfy the semantic constraint 112 (and disparate semantic constraint(s) and syntactic constraint(s) if included in the mixed query 108). The results 116 can be retrieved from the database 102 retained in the data repository 104 (e.g., memory, data store, etc.). Moreover, the results 116 can be outputted by the interface component 106. According to an illustration, the interface component 106 can output the results 116 to a disparate database, a display screen (e.g., for display thereupon), or the like.

Semantic constraints (e.g., the semantic constraint 112, etc.) included in the mixed query 108 restrict meanings of corresponding wildcards in the regular expression 110. The following provides various examples of semantic constraint types. In the below examples, $*w_1$ is a word wildcard, $*p_1$ is a phrase wildcard, and $w_2$ is a given word. However, it is contemplated that other semantic constraint types are intended to fall within the scope of the hereto appended claims.

For example, a semantic constraint can restrict a corresponding wildcard to be a synonym of a given word. For instance, Synonym($*w_1$, $w_2$) means that the word wildcard $*w_1$ is restricted to be a synonym of the given word $w_2$. By way of illustration, Synonym($*w_1$, happy) restricts the word wildcard $*w_1$ to be a synonym of the word "happy."

According to another example, a semantic constraint can restrict a corresponding wildcard to be an antonym of a given word. For instance, Antonym($*w_1$, $w_2$) means that the word wildcard $*w_1$ is restricted to be an antonym of the given word $w_2$. According to an illustration, Antonym($*w_1$, far) restricts the word wildcard $*w_1$ to be an antonym of the word "far."

In accordance with another example, a semantic constraint can restrict a corresponding wildcard to a sense of a given word. WordSense($*w_1$, $w_2$, Sense) means that the word wildcard $*w_1$ is restricted to match the specified Sense of the given word $w_2$. An illustration of this example is WordSense($*w_1$, bridge, road); following this illustration, the word wildcard $*w_1$ is restricted to have the sense of a road-bridge as opposed to other types of bridges (e.g., a dental-bridge, etc.).

According to yet another example, a semantic constraint 112 can restrict a corresponding wildcard based on a negated semantic constraint (e.g., not a synonym, not an antonym, etc.). For instance, Not(Synonym($*w_1$, confused)) restricts the word wildcard $*w_1$ to not be a synonym of the word "confused."

It is to be appreciated, however, that the claimed subject matter is not limited to the foregoing semantic constraint types, and other semantic constraint types are intended to fall within the scope of the hereto appended claims. For example, a semantic constraint, such as HasLocation($*p_1$) can be used to restrict the phrase wildcard $*p_1$ to include a location such as, for instance, "New York," "Oregon," or the like. Yet, it is again to be appreciated that the claimed subject matter is not so limited.

Syntactic constraints included in the mixed query 108 restrict grammatical construction of corresponding wildcards in the regular expression 110. The following provides various examples of syntactic constraint types. Again, in the below examples, $*w_1$ is a word wildcard, $*p_1$ is a phrase wildcard, and $w_2$ is a given word. However, it is contemplated that other syntactic constraint types are intended to fall within the scope of the hereto appended claims.

By way of example, a syntactic constraint can restrict a corresponding wildcard to a given part of speech. For instance, POS($*w_1$, ps) means that the word wildcard $*w_1$ is restricted to have a part-of-speech label ps. According to an illustration, POS($*w_1$, noun) restricts the word wildcard $*w_1$ to be a noun.

According to yet a further example, a syntactic constraint can restrict a corresponding wildcard to a given set of words. For instance, OneOf($*w_1$, (ConstantWord| . . . )) means that the word wildcard $*w_1$ is restricted to be one of the enumerated words. By way of illustration, OneOf($*w_1$, (formal|mature|refined)) restricts the word wildcard $*w_1$ to be one of the three enumerated words in the set: "formal," "mature," or "refined."

According to another example, a syntactic constraint can restrict a corresponding wildcard to a given parse-subtree tag. Parse($*p_1$, nt) means that a parse tree covering the phrase wildcard $*p_1$ is restricted to having a non-terminal tag nt. By way of illustration, Parse($*p_1$, verb-phrase) restricts the parse tree covering the phrase wildcard $*p_1$ to have a verb-phrase tag. Further, it is contemplated that in the case where the phrase wildcard $*p_1$ does not constitute a full subtree, then this constraint can fail.

In accordance with yet another example, a syntactic constraint can restrict a corresponding wildcard to a maximum number of words. For instance, Short($*p_1$) means that the phrase wildcard $*p_1$ is restricted to include less than a threshold number of words (e.g., less than five words, etc.).

According to an example, the mixed query 108 (Query Q) can be described pursuant to the following formal language. It is contemplated, however, that the claimed subject matter is not limited to the example set forth below.

```
Query Q := (Regex R, Constraint C)
Regex R := e_1 e_2 . . . e_n
Element e := w | p
    Word w := {ConstantWord_i}_i | *w_i
    Phrase p := {ConstantPhrase_i}_i | *p_i
Constraint C := pd_1 & pd_2 & pd_3 & . . . pd_x
Predicate pd := Synonym(*w_1, w_2) | Antonym(*w_1, w_2)
              | WordSense(*w_1, w_2, Sense)
              | POS(*w_1, ps)
              | OneOf(*w_1, (ConstantWord| . . . ))
              | Parse(*p_1, nt)
              | Short(*p_1) | Not(pd)
```

In the foregoing semantic query language used to describe semantic and lexical constraints of the mixed query 108, Regex R is the regular expression 110 and Constraint C are the constraints (e.g., the semantic constraints including the semantic constraint 112 and the syntactic constraints). The regular expression 110, Regex R, includes n elements (e.g., $e_1, \ldots, e_n$), where n is substantially any positive integer. The n elements are in a pattern. Moreover, an element e can be either a word (w) or a phrase (p). A word can be a constant word or a word wildcard ($*w_i$), and a phrase can be a constant phrase or a phrase wildcard ($*p_i$). Further, the constraints, Constraint C, include x predicates (e.g., x semantic constraints), where x is substantially any positive integer. Each of the x predicates (e.g., $pd_1, \ldots, pd_x$) can be a semantic constraint or a syntactic constraint. Constraint C can be a conjunction of the x predicates.

According to other examples, however, it is contemplated that the foregoing language need not be employed for the mixed query 108. For instance, the mixed query 108 may be formed using a natural language syntax; yet, the claimed subject matter is not so limited.

Figure 2:
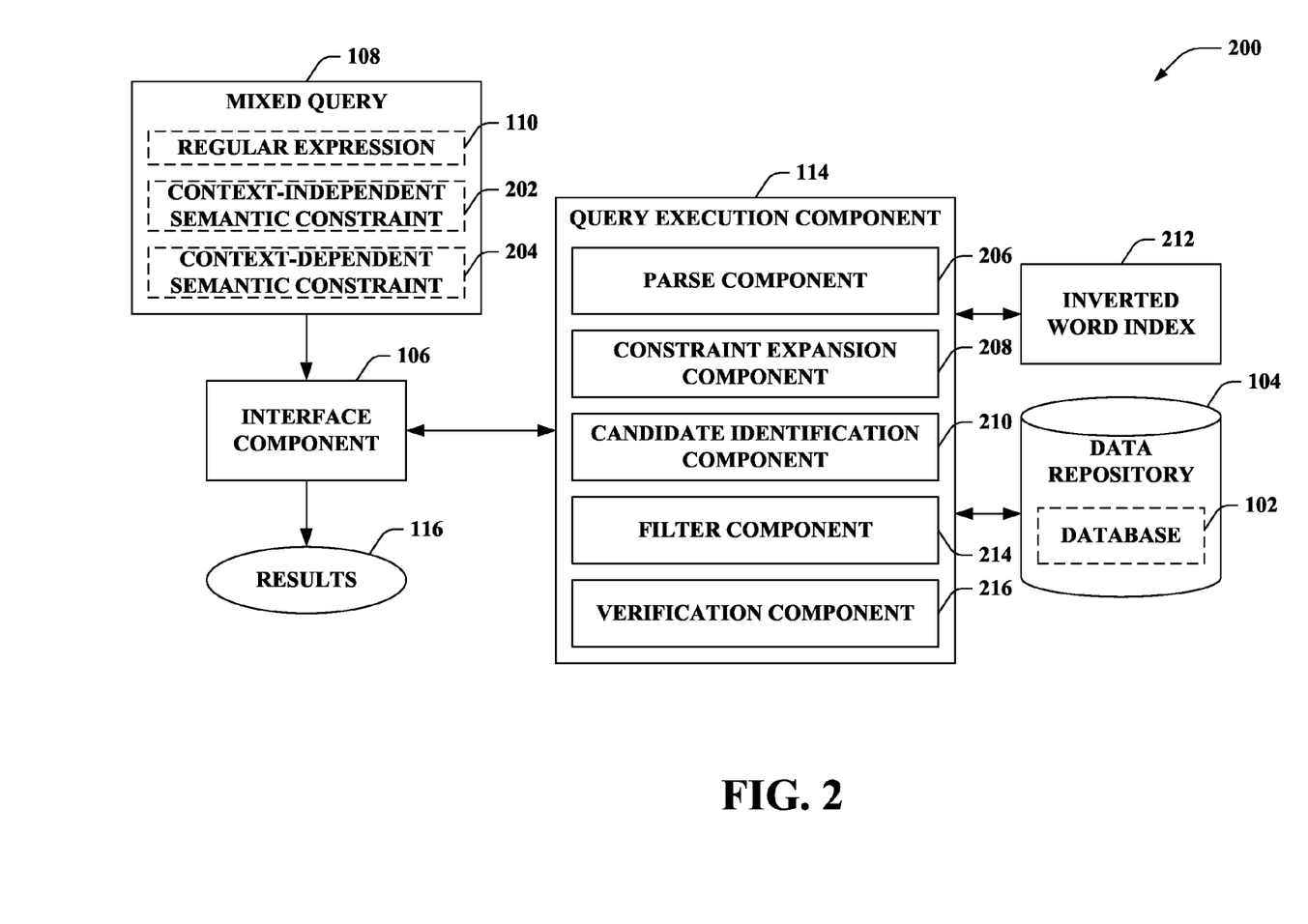
FIG. 2 illustrates a functional block diagram of an exemplary system that executes a mixed query to retrieve results from the database retained in the data repository.

Now turning to FIG. 2, illustrated is a system 200 that executes the mixed query 108 to retrieve the results 116 from the database 102 retained in the data repository 104. The system 200 includes the interface component 106 and the query execution component 114. Similar to above, the interface component 106 receives the mixed query 108, where the mixed query 108 includes the regular expression 110 and constraints. The constraints include semantic constraints. More particularly, the semantic constraints include at least a context-independent semantic constraint 202 and a context-dependent semantic constraint 204. For instance, the semantic constraint 112 of FIG. 1 can be either the context-independent semantic constraint 202 or the context-dependent semantic constraint 204; yet, the claimed subject matter is not so limited. Further, although not described in the below examples, it is contemplated that the constraints can also include syntactic constraints; however, the claimed subject matter is not so limited.

As set forth above, the regular expression 110 is a pattern of elements. The elements in the regular expression 110 include at least a first wildcard, a second wildcard, and an explicit lexical constraint (e.g., a constant word, a constant phrase, or a disparate constant string of characters). A first semantic constraint restricts a meaning of the first wildcard in the regular expression 110. The first semantic constraint, for instance, can be the context-independent semantic constraint 202. Moreover, a second semantic constraint restricts a meaning of the second wildcard in the regular expression 110. For instance, the second semantic constraint can be the context-dependent semantic constraint 204.

As noted above, the terms "first" and "second" are not intended to denote an order. Accordingly, the first wildcard and the second wildcard can respectively be positioned at substantially any location with respect to each other within the pattern of elements. Moreover, the first semantic constraint and the second semantic constraint can respectively be positioned at substantially any location with respect to each other within the semantic constraints.

It is also to be appreciated that the regular expression 110 can include substantially any number of wildcards in addition to the first wildcard and the second wildcard. Moreover, it is contemplated that the regular expression 110 can include substantially any number of additional explicit lexical constraints. Yet, the claimed subject matter is not limited to the foregoing.

Further, it is contemplated that there need not be a one-to-one correspondence between wildcards and semantic constraints. For example, multiple semantic constraints can restrict a meaning of a particular wildcard (e.g., a particular semantic constraint can restrict the particular wildcard to be a synonym of the word "derive" and a disparate semantic constraint can restrict the particular wildcard to not be the word "determine," etc.). By way of another example, it is contemplated that a semantic constraint can restrict meanings of multiple wildcards.

The semantic constraints of the mixed query 108 can include two different types of semantic constraints, namely, those that are context-independent which can be expanded into lexical constraints (e.g. expanded lexical constraints), and those which are context-dependent (e.g., unable to be directly expanded into such lexical constraints). The context-independent semantic constraints can include Synonym and Antonym. For instance, synonyms and antonyms can be read in (e.g., from a file, etc.) and semantic constraints that include synonyms and antonyms can be expressed as elements of the regular expression 110. The context-dependent semantic constraints can be WordSense and semantic constraints using the Not operator. Such context-dependent semantic constraints can depend on a context of a whole sentence and, therefore, can be applied as part of a filtering approach after candidate sentences are identified rather than when identifying candidate sentences. Thus, the context-independent semantic constraint 202 can restrict the first wildcard to be a synonym of a first given word or an antonym of the first given word. Further, the context-dependent semantic constraint 204 can restrict the second wildcard to have a sense of a second word or can restrict the second wildcard based on a negated semantic constraint.

The query execution component 114 can employ a matching procedure when executing the mixed query 108 to retrieve the results 116 that match the pattern of the elements in the regular expression 110 and satisfy the semantic constraints. More particularly, the query execution component 114 can include a parse component 206. The parse component 206 can parse the mixed query 108 into the regular expression 110 and the constraints. Further, the parse component 206 can identify the context-independent semantic constraint 202 and the context-dependent semantic constraint 204. Moreover, the query execution component 114 can include a constraint expansion component 208 that expands the context-independent semantic constraint 202 into an expanded lexical constraint. The constraint expansion component 208 can similarly expand other context-independent semantic constraint(s) included in the mixed query 108 into expanded lexical constraint(s). According to an illustration, the constraint expansion component 208 can expand a Synonym constraint by reading in synonyms of a given word (e.g., from a file, etc.). Likewise, the constraint expansion component 208 can expand an Antonym constraint by reading in antonyms of a given word (e.g., from a file, etc.).

The query execution component 114 can further include a candidate identification component 210 that identifies candidate sentences from the database 102 that include words specified by the expanded lexical constraint and the explicit lexical constraint (as well as other expanded lexical constraint(s) and explicit lexical constraint(s), if any). According to an example, the candidate identification component 210 can identify the candidate sentences from the database 102 using an inverted word index 212. The inverted word index 212 can include a mapping, for words included in the database 102, from a word to a set of sentences that include the word. Hence, the candidate identification component 210 can use the inverted word index 212 to decrease latency when identifying candidate sentences from the database 102; yet, it is contemplated that the claimed subject matter is not limited to the foregoing.

According to an example, the candidate identification component 210 can apply the expanded lexical constraint and the explicit lexical constraint in an order from most restrictive lexical constraint to least restrictive lexical constraint when identifying the candidate sentences from the database 102 where such candidate sentences include the words specified by the expanded lexical constraint and the explicit lexical constraint. By way of illustration, if a sentence includes three words such as "forlorn," "water," and "is," then the candidate identification component 210 can cause candidates sentences from the database 102 that include "forlorn" to be collected first (e.g., resulting in a relatively small set). Therefore, the candidate sentences can be further refined (e.g., based on "water"), and so forth.

The query execution component 114 further includes a filter component 214 that filters the candidate sentences from the database 102 based on whether the candidate sentences match the pattern of the elements in the regular expression 110. Moreover, the filter component 214 can output filtered candidate sentences from the database 102 determined to match the elements in the regular expression 110. The filter component 214 can use regular expression matching to find which of the candidate matches satisfy the regular expression 110 and the expanded lexical constraint(s).

The query execution component 114 further includes a verification component 216 that can evaluate whether the filtered candidate sentences from the database 102 satisfy the context-dependent semantic constraint 204 (as well as other context-dependent semantic constraint(s), if any). The filtered candidate sentences determined by the verification component 216 to satisfy the context-dependent semantic constraint 204 (and the other context-dependent semantic constraint(s)) can be retrieved by the query execution component 114 and outputted as the results 116. Thus, the verification component 216 can employ a filtering technique that checks the remaining candidate matches to evaluate whether such matches satisfy the context-dependent semantic constraints.

By way of another example, the query execution component 114 can further employ a language model (e.g., N-gram language model, etc.). The language model can be used to score the results 116 outputted by the query execution component 114. For instance, respective scores for the results 116 can be outputted by the query execution component 114. According to another illustration, the scores can be compared to a threshold score to filter the results 116 outputted by the query execution component 114. However, it is to be appreciated that the claimed subject matter is not limited to utilization of a language model.

Moreover, it is contemplated that the mixed query 108 can include syntactic constraint(s). It is to be appreciated that the syntactic constraint(s) can be pre-computed and utilized in the foregoing matching procedure implemented by the query execution component 114. According to an example, whether to pre-compute the syntactic constraint(s) can be a function of an amount of computer memory available, information available in the database 102 being processed, a combination thereof, etc.

Although the foregoing embodiment describes that the constraint expansion component 208 expands the context-independent semantic constraints, such as Synonym and Antonym, into expanded lexical constraints and the candidate identification component 210 identifies candidate sentences from the database 102 that include words specified by the expanded lexical constraints and the explicit lexical constraint, it is contemplated that the context-independent semantic constraints can additionally or alternatively be utilized by the verification component 216. For instance, a degree of similarity or oppositeness can be computed by the verification component 216 for Synonym or Antonym constraints. Accordingly, the verification component 216 can determine whether such constraints are met by comparing the degree of similarity or the degree of oppositeness to threshold values. Yet, it is contemplated that the claimed subject matter is not limited to the foregoing example.

The following sets forth an example of query execution performed by the query execution component 114. It is to be appreciated that the below example is provided for illustration purposes, and the claimed subject matter is not intended to be limited to such example.

According to this example, the mixed query 108 executed by the query execution component 114 can be the following:

$$Q(w)=(*w_1*p_1 \text{ as } w*w_2*p_2, C)$$

where C=Synonym($*w_1$, characterized) and Synonym ($*w_2$, because) and OneOf(w, (mercurial)) and Parse ($*p_2$, S)

The mixed query 108, Q(w), can be received by the interface component 106. Moreover, the query execution component 114 can execute such query. More particularly, the parse component 206 can parse the mixed query 108, Q(w), into the regular expression, $*w_1*p_1$ as w $*w_2*p_2$, and the constraints, C.

The constraint expansion component 208 can expand context-independent semantic constraints into expanded lexical constraints. In the foregoing example, the Synonym constraints can be expanded. Accordingly, a first word wildcard $*w_1$, which is restricted to be a synonym of "characterized," can be expanded to (characterized|described|defined|portrayed) (e.g., the first word wildcard $*w_1$ can be restricted to be "characterized," "described," "defined," or "portrayed"). Further, a second word wildcard $*w_2$, which is restricted to be a synonym of "because," can be expanded to (because|since|considering) (e.g., the second word wildcard $*w_2$ can be restricted to be "because," "since," or "considering).

Accordingly, the candidate identification component 210 can identify candidate sentences from the database 102 that include (characterized|described|defined|portrayed) & (because|since|considering) & (mercurial). It is to be noted that this is a conjunction of disjunctions. The candidate identification component 210 can use the inverted word index 212 to identify candidate sentences from the database 102. For instance, the candidate identification component 210 can evaluate each part of the conjunction set forth above, and collect indexes of sentences that include one of the words. For example, the sentences satisfying the three respective constraints may be associated with the following sets of indexes: {18, 234, 63, 12, 763}, {18, 44, 585, 763, 12}, {18, 763, 12, 800}. Accordingly, the candidate identification component 210 can find that sentences that satisfy the three foregoing constraints by determining the intersection of the foregoing sets of indexes, which results in {18, 763, 12}.

Moreover, the filter component 214 can use regular expression matching to find potential matches that satisfy the regular expression 110 and the pre-expanded semantic constraints. Accordingly, following the above noted example, the regular expression to be matched by the filter component 214 (employing standard notation) is as follows: (characterized|described|defined|portrayed) (\w+\s+)+ as mercurial (because|since|considering) (4+\s+)±. According to an illustration, perhaps sentence 18 includes "because" preceding "characterized," which fails to match the above regular expression. Accordingly, sentences {763, 12} can remain as candidate sentences after the filtering by the filter component 214.

Moreover, the verification component 216 can check the remaining candidate sentences to analyze whether such candidate sentences satisfy the context-dependent semantic constraints. Similarly, context-dependent syntactic constraints can be analyzed by the verification component 216. In the continuing example, the constraints include a context-dependent syntactic constraint (e.g., Parse($*p_2$, S)). Thus, the phrase at the end of the sentence (e.g., after the synonym of "because") is restricted to constituting a sentence. For instance, sentence 763 may recite the following: "He was characterized as mercurial because of it." In such case, the final words "because of it" parse to a prepositional phase, and such candidate sentence can be rejected by the verification component 216 due to the parse tag being set for phrase $*p_2$ as a sentence. Moreover, sentence 12 may recite the following: "Willy's mood can be described as mercurial since it is always changing either towards his wife or sons." Following this illustration, since sentence 12 includes "it is always changing either towards his wife or sons" after "since," the verification component 216 can determine that sentence 12 satisfies the context-dependent syntactic constraint.

Figure 3:
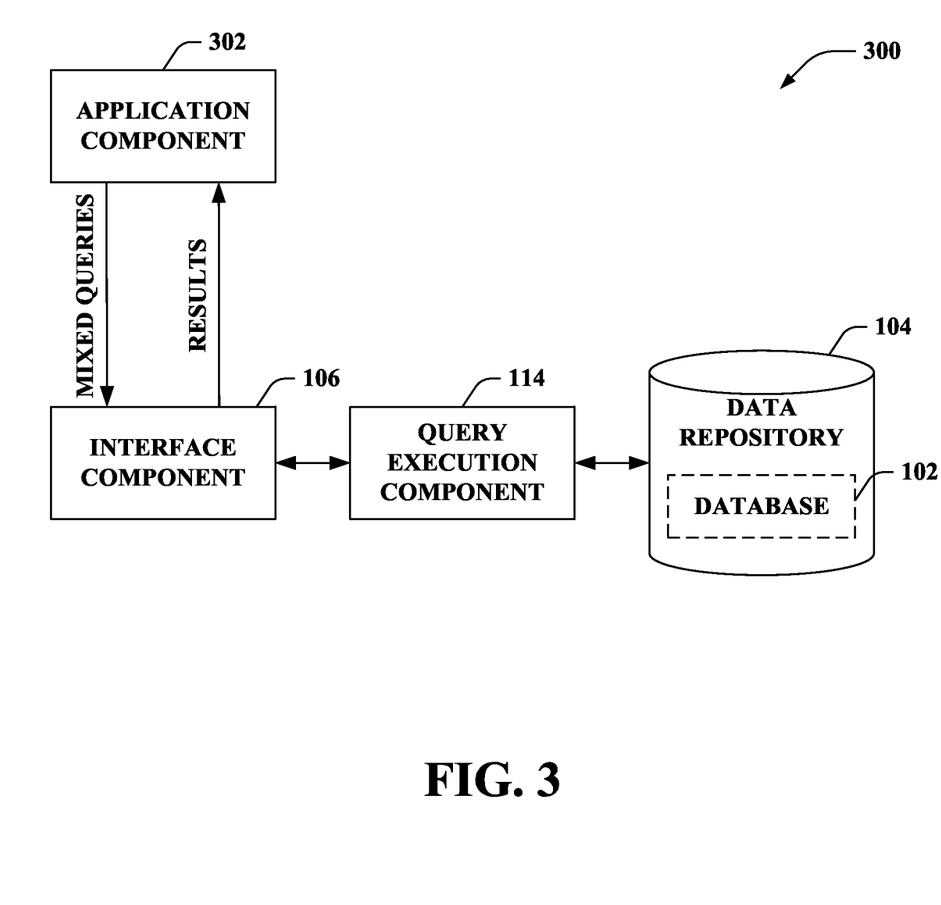
FIG. 3 illustrates a functional block diagram of an exemplary system that implements an application that employs the mixed queries to search the database retained in the data repository.

Turning to FIG. 3, illustrated is a system 300 that implements an application that employs mixed queries to search the database 102 retained in the data repository 104. The system 300 includes an application component 302 that controls a set of mixed queries outputted for the application. For instance, the application can be an interactive language tutoring application. According to another example, the application can be a question answering application. Yet, it is contemplated that other types of applications are intended to fall within the scope of the hereto appended claims.

The application component 302 can control the set of mixed queries outputted for the application as noted above. A particular mixed query in the set of mixed queries can include a common regular expression and a variable constraint. The mixed query can be a parameterized query (e.g., the mixed query can be run multiple times on different choices for a parameter, namely, the variable constraint). The variable constraint can be a function of the particular mixed query in the set. Accordingly, disparate mixed queries in the set can be associated with differing variable constraints. Moreover, the disparate mixed queries in the set can include the common regular expression, where the common regular expression is a pattern of elements.

The interface component 106 can receive the set of mixed queries from the application component 302. Further, the query execution component 114 can execute the set of mixed queries to retrieve, from the database 102 in the data repository 104, respective results that match the pattern of the elements in the common regular expression and satisfy the variable constraint for each of the mixed queries in the set. The interface component 106 can return the respective results for each of the mixed queries in the set to the application component 302. Moreover, the application component 302 can utilize the respective results for the application.

According to an example, the application can be an interactive language tutoring application. Following this example, the application component 302 can control the variable constraint to restrict the meaning of the first wildcard to be a particular word in a first mixed query in the set. Moreover, the application component 302 can generate a sentence from the respective results corresponding to the first mixed query given the pattern of the elements and the particular word. The application component 302 can also control the variable constraint to restrict the meaning of the first wildcard to be an antonym of the particular word in a second mixed query in the set. Following this example, the application component 302 can generate an incorrect alternative word for the sentence from the respective results corresponding to the second mixed query. By way of further illustration, the application component 302 can control the variable constraint to restrict the meaning of the first wildcard to be inhibited from being a synonym of the particular word in a third mixed query in the set (e.g., the variable constraint can be Not(Synonym(particular word))). Hence, the application component 302 can generate an incorrect alternative word for the sentence from the respective results corresponding to the third mixed query.

According to another example, incorrect alternative words can be chosen from amongst words in a specific position within a set of sentences from the database 102. The incorrect alternative words can be chosen based on the common regular expression and the variable constraint. Thus, queries with weak constraints can be used to generate incorrect alternative words (e.g., distractors) for sentence completion questions. By way of illustration, a first mixed query in the set can search for "John *w1 art" with a semantic constraint such as Synonym(*w1, learned), which can return the sentence "John mastered art." Following this illustration, a second mixed query in the set can be a simpler query such as "John *w1" with a semantic constraint such as Not(Synonym(*w1, learned). Accordingly, words in the specific position within the set of sentences from the database 102 can include, for instance, "scratches," "ran," "smelled," "bit," and so forth. In contrast, conventional approaches commonly rearrange an original sentence, and thereafter generate incorrect alternative words based on the re-arrangement.

The following provides an illustration of the interactive language tutoring application implemented by the application component 302; yet, it is to be appreciated that the claimed subject matter is not limited to such illustration.

Suppose the application component 302 gives a student the following sentence completion question, and the student incorrectly answers "mercurial."

The principal characterized his pupils as ______ because they were pampered and spoiled by their indulgent parents.

(a) cosseted
(b) disingenuous
(c) corrosive
(d) laconic
(e) mercurial

Following this illustration, since the student mistakenly answered "mercurial," the application component 302 can test "mercurial" in a similar sentence. Accordingly, the application component 302 can generate the following mixed query to retrieve sentences from the database 102 that are similar:

$$Q(w)=(*w_1 *p_1 \text{ as } w*w_2, C)$$

where C=Synonym(*$w_1$, characterized) and Synonym(*$w_2$, because) and OneOf(w, (mercurial))

In the above mixed query, *$w_1$ and *$w_2$ are word wildcards, and *$p_1$ is a phrase wildcard. Semantically, *$w_1$ is constrained to be a synonym of "characterized" and *$w_2$ is constrained to be a synonym of "because." Moreover, w is a word variable (e.g., variable constraint), which is constrained to be "mercurial" in this mixed query. The foregoing query can result in the following sentence being returned (e.g., in the results): "Willy's mood can be described as mercurial since it is always changing either towards his wife or sons." Note that neither the word "characterized" nor the word "because" is present in the returned sentence. Accordingly, the application component 302 can use the returned sentence to form another sentence completion question for the student. An example of such sentence completion question is as follows:

Willy's mood can be described as ______ since it is always changing either towards his wife or sons.
(a) mercurial
(b) . . . (e)

Moreover, answers (b) through (e) can be incorrect alternative words generated by the application component 302 as set forth above.

According to another example, the application can be a question answering application. Following this example, the application component 302 can control the variable constraint to restrict the meaning of the first wildcard to be a first word or phrase in a first mixed query in the set, and can control the variable constraint to restrict the meaning of first wildcard to be a second word or phrase in a second mixed query in the set. Following this example, the application component 302 can determine a first answer associated with the first word or phrase from the respective results corresponding to the first mixed query. Further, the application component 302 can determine a second answer associated with the second word or phrase from the respective results corresponding to the second mixed query.

The following provides another illustration; in such illustration, a question answering application is implemented by the application component 302. However, it is to be appreciated that the claimed subject matter is not limited to such illustration.

Suppose a user wants to map each person's name in a spreadsheet column to an institute from which he or she obtained his or her Phd. Accordingly, the application component 302 can generate the following mixed query to receive the desired information for a person whose name is w.

$$Q(w)=(w*p_1*w_1 \text{ his/her } Phd*p_2*w_2*p_3, C)$$

where C=Synonym(*$w_1$, received) and POS(*$w_2$, from)

In the foregoing mixed query, *$p_1$ may represent some filler text between the name of the person and some sentence that contains the desired information (possibly within a biography paragraph). Further, $*w_1$ may match words like "received", "finished," "earned," and "obtained." Moreover, $*w_2$ may match words like "from," "at," "in," and "with."$*p_2$ may match an area in which the Phd was obtained, while $*p_3$ may bind to the institute from which the Phd was obtained.

Figure 4:
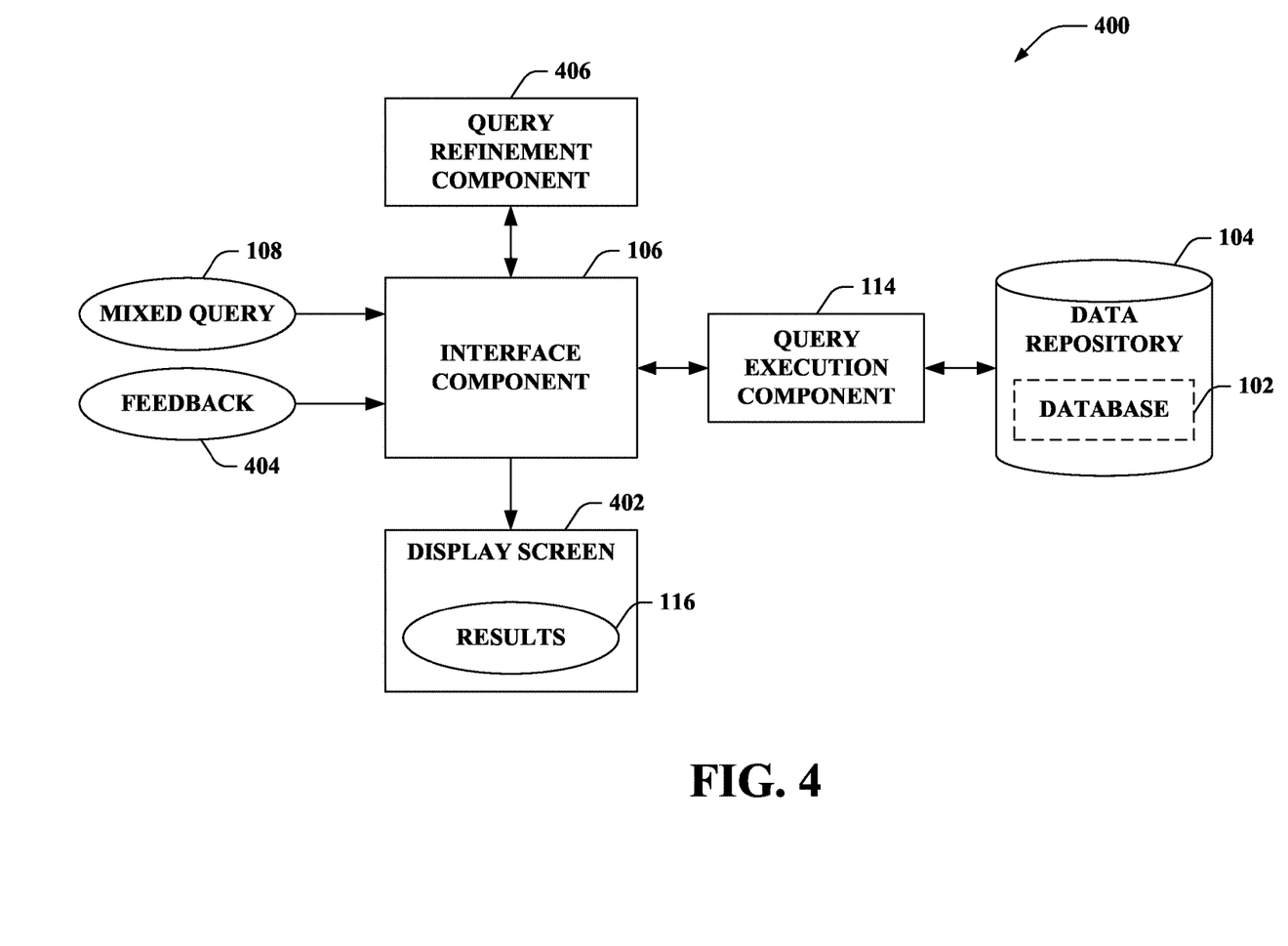
FIG. 4 illustrates a functional block diagram of an exemplary system that iteratively generates the mixed query.

Now turning to FIG. 4, illustrated is a system 400 that iteratively generates the mixed query 108. The interface component 106 can receive an initial mixed query that includes a regular expression and a set of constraints (e.g., semantic constraints and/or syntactic constraints). The regular expression, as noted herein, is a pattern of elements. Further, the query execution component 114 can execute the initial mixed query to retrieve the results 116 from the database 102 that match the pattern of the elements in the regular expression and satisfy the set of constraints. Moreover, the interface component 106 can cause the results 116 to be displayed on a display screen 402, for instance.

Feedback 404 related to the results 116 can be received by the interface component 106. For instance, the feedback 404 can specify a subset of the results 116 that are undesirably retrieved in response to the initial mixed query. Further, the feedback 404 can specify a set of missing results that are undesirably omitted from the results 116 retrieved in response to the initial mixed query.

The system 400 further includes a query refinement component 406 that utilizes the feedback 404 to automatically generate a refined mixed query. The refined mixed query can be automatically generated by the query refinement component 406 based on a user indicating which of the results 116 returned by the execution of a previous version of the mixed query were not desirable and/or results undesirably missing from the previous results 116 returned by the execution of the previous version of the mixed query. For instance, the query refinement component 406 can perform programming by example; however, the claimed subject matter is not so limited. Moreover, the construction of the refined mixed query can continue until the user is satisfied with the results 116 generated by the query execution component 114.

The interface component 106 can receive the refined mixed query. For instance, the regular expression and/or the set of constraints can be refined responsive to the results 116 to construct the refined mixed query. Moreover, the query execution component 114 can execute the refined mixed query to retrieve updated results from the database 102 that match the pattern of the elements in the regular expression and satisfy the set of constraints as refined. Moreover, the interface component 106 can cause the updated results to be displayed on the display screen 402.

According to another embodiment (not shown), a user can interactively construct the initial mixed query and can possibly refine the initial mixed query based on the results 116 rendered on the display screen 402. Thus, the user can manually generate the refined mixed queries. It is contemplated, however, that the claimed subject matter is not so limited.

Iterative query generation can be utilized for parameterized queries since such queries may be run multiple times on different choices for a parameter. For instance, the parameterized queries can be used in connection with an application executed by the application component 302 of FIG. 3; yet, the claimed subject matter is not so limited.

Figure 5:
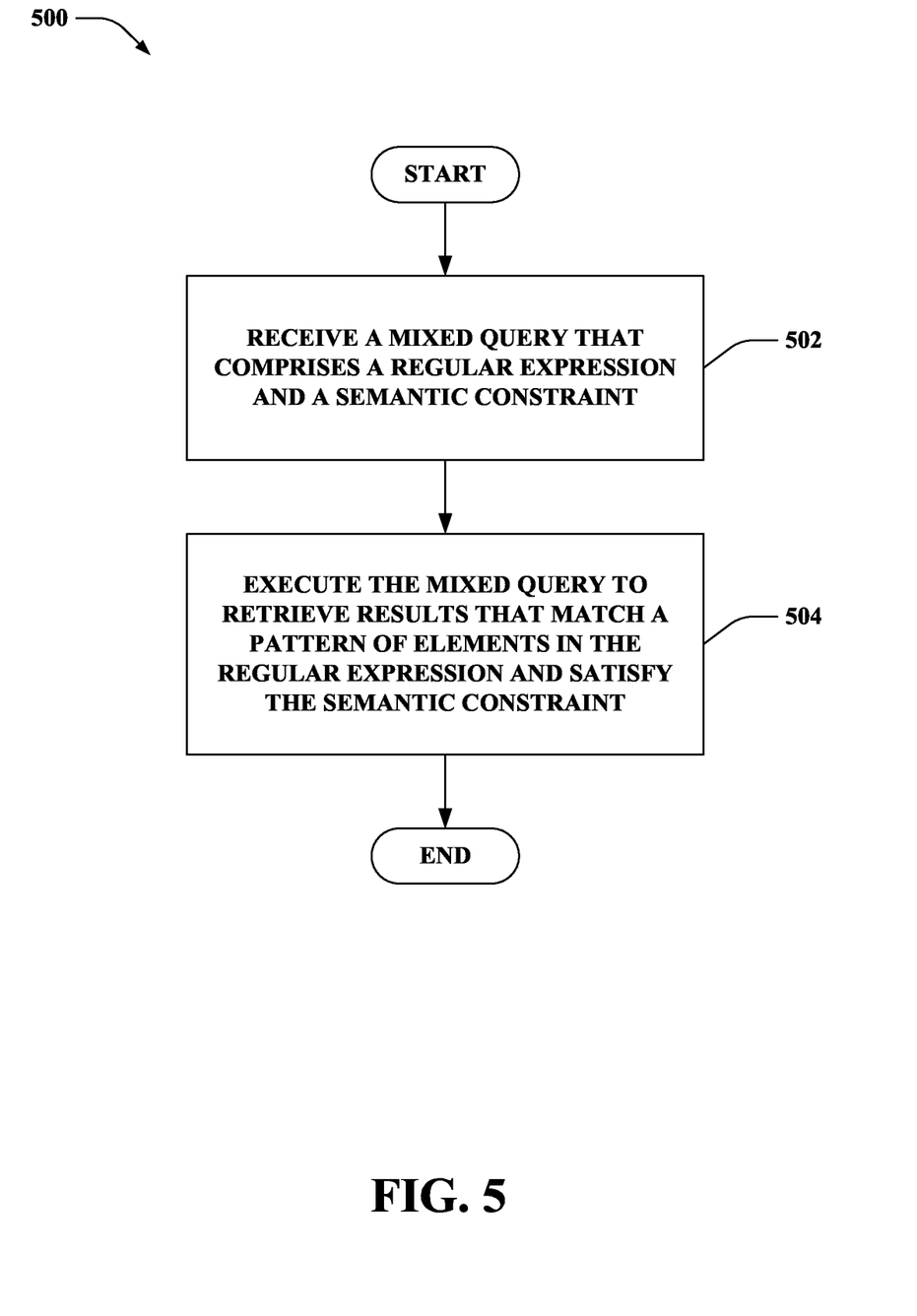
FIG. 5 is a flow diagram that illustrates an exemplary methodology of searching a database retained in a data repository.
Figure 6:
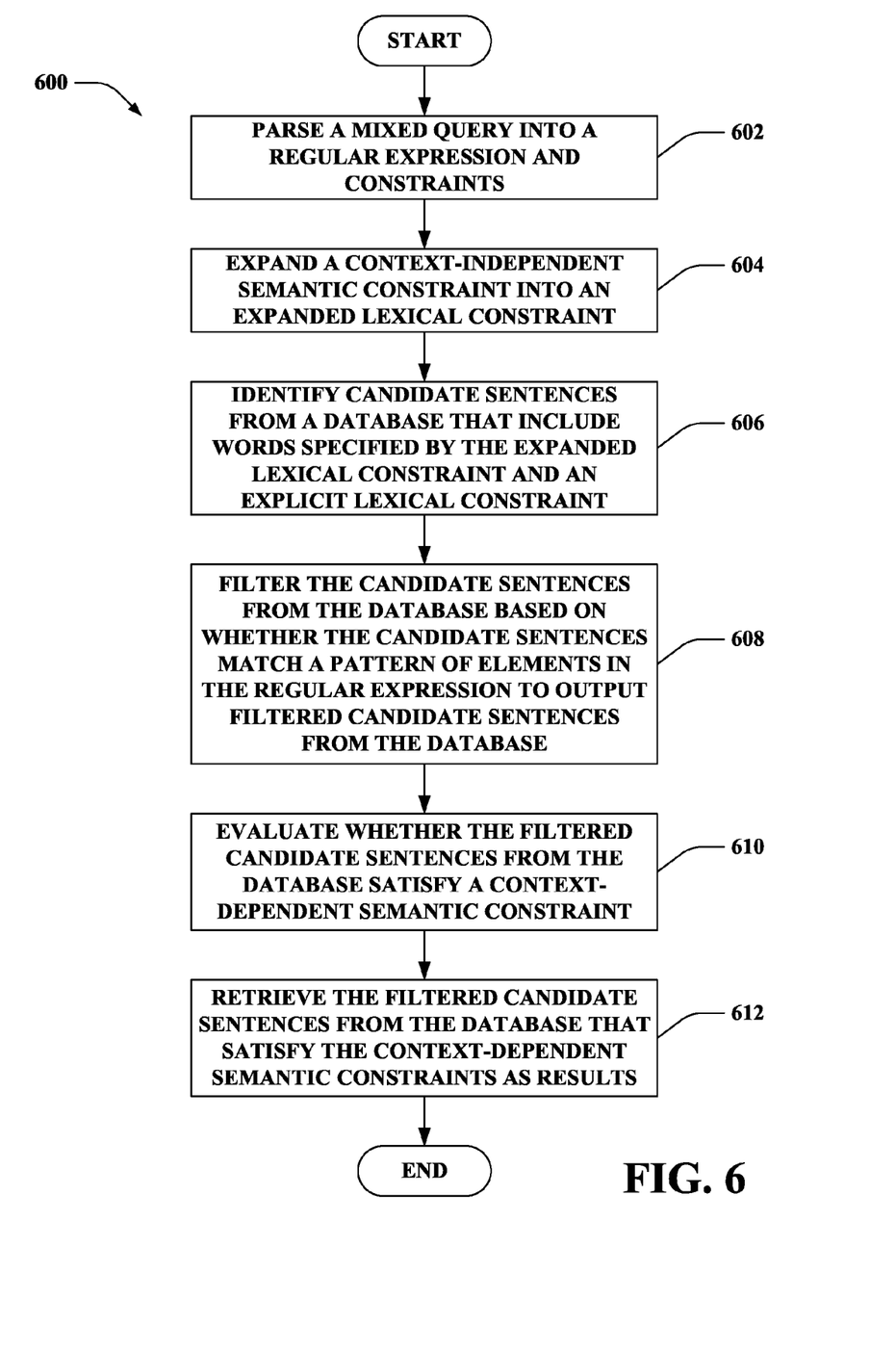
FIG. 6 is a flow diagram that illustrates an exemplary methodology of executing a mixed query.
Figure 7:
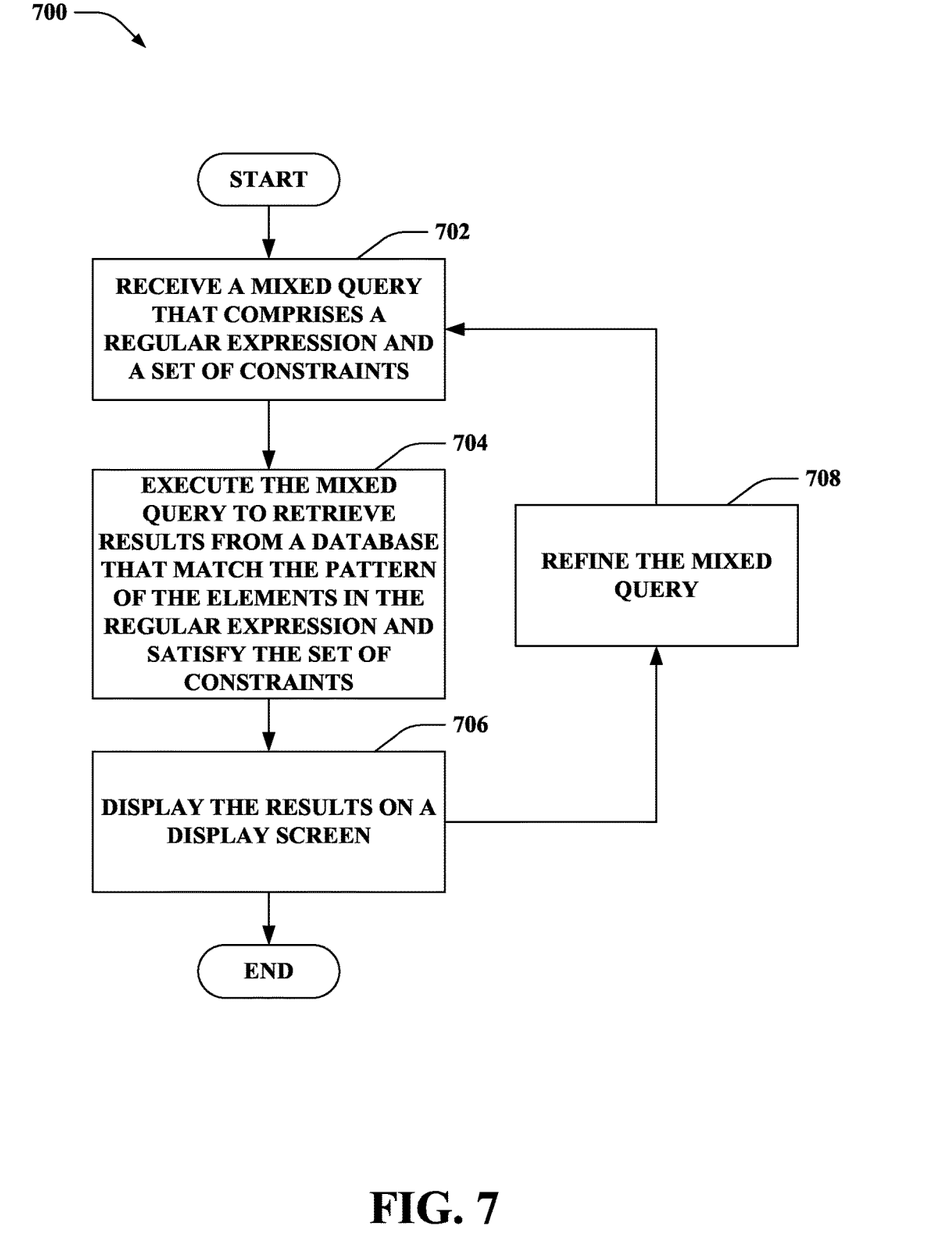
FIG. 7 is a flow diagram that illustrates an exemplary methodology of interactively generating and executing a mixed query.

FIGS. 5-7 illustrate exemplary methodologies relating to executing a mixed query to search a database. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 of searching a database retained in a data repository. At 502, a mixed query that comprises a regular expression and a semantic constraint can be received. The regular expression is a pattern of elements. Further, the elements in the regular expression include a first wildcard and at least one of an explicit lexical constraint or a second wildcard. Moreover, it is contemplated that the elements in the regular expression can include other wildcards and/or other explicit lexical constraints. At 504, the mixed query can be executed. For instance, at least one processor on at least one computing device can be utilized to execute the mixed query. The mixed query can be executed to retrieve results that match a pattern of elements in the regular expression and satisfy the semantic constraint. Accordingly, the results can be retrieved from the database retained in the data repository.

With reference to FIG. 6, illustrated is a methodology 600 of executing a mixed query. At 602, the mixed query can be parsed into a regular expression and constraints. The constraints include semantic constraints. The semantic constraints can include context-independent semantic constraint(s) and context-dependent semantic constraint(s). Further, the constraints can include syntactic constraints. At 604, a context-independent semantic constraint can be expanded into an expanded lexical constraint. At 606, candidate sentences from a database that include words specified by the expanded lexical constraint and an explicit lexical constraint can be identified. At 608, the candidate sentences from the database can be filtered based on whether the candidate sentences match a pattern of elements in the regular expression. Accordingly, filtered candidate sentences from the database can be outputted via such filtering. At 610, an evaluation can be performed concerning whether the filtered candidate sentences from the database satisfy a context-dependent semantic constraint. At 612, the filtered candidate sentences from the database that satisfy the context-dependent semantic constraint can be retrieved as results. Such results can be displayed on a display screen, included in a database, or outputted in substantially any other manner.

Referring now to FIG. 7, illustrated is a methodology 700 of interactively generating and executing a mixed query. At 702, a mixed query that comprises a regular expression and a set of constraints can be received. The set of constraints includes semantic constraints, for example. At 704, the mixed query can be executed to retrieve results from a database that match the pattern of the elements in the regular expression and satisfy the set of constraints. At 706, the results can be displayed on a display screen. Accordingly, when displayed, the results can be verified (e.g., by a user, etc.). At 708, the mixed query can be refined. For example, the mixed query can be manually refined by a user. According to another example, the mixed query can be automatically refined; such automatic refinement of the mixed query can be based on feedback received from the user. The feedback can specify a subset of the results that are undesirably retrieved in response to a previous mixed query. Moreover, the feedback can specify a set of missing results that are undesirably omitted from the results retrieved in response to the previous mixed query. The methodology 700 can continue with the mixed query continuing to be refined for substantially any number of iterations (e.g., until the results are verified by the user, etc.).

Figure 8:
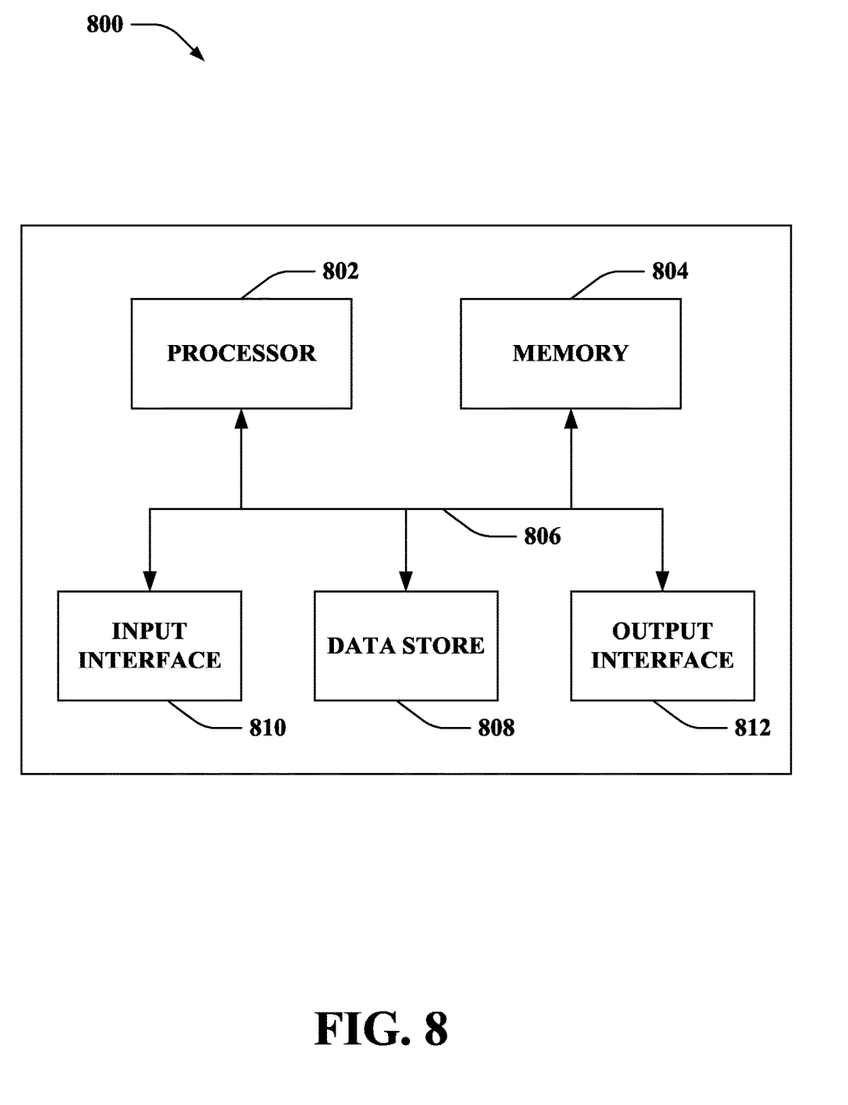
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be used in a system that generates and executes a mixed query to search for results from a database. By way of another example, the computing device 800 can be used in a system that implements an application that uses results returned responsive to a mixed query. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store a database, a mixed query, results, and so forth.

The computing device 800 additionally includes a data store 808 that is accessible by the processor 802 by way of the system bus 806. The data store 808 may include executable instructions, a database, a mixed query, results, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of searching a database retained in a data repository, comprising:
iteratively generating a mixed query, the mixed query comprises:
a regular expression, the regular expression is a pattern of elements, and the elements in the regular expression comprise:
a first wildcard; and
at least one of an explicit lexical constraint or a second wildcard; and
a semantic constraint, the semantic constraint includes a restriction to a meaning of a match returned responsive to the first wildcard; and
wherein iteratively generating the mixed query further comprises:
executing a previous version of the mixed query to retrieve previous results from the database retained in the data repository;
receiving feedback concerning the previous results retrieved in response to executing the previous version of the mixed query, the feedback specifies at least one of a subset of the previous results undesirably retrieved in response to executing the previous version of the mixed query or a set of missing results undesirably omitted from the previous results retrieved in response to executing the previous version of the mixed query;
performing programming by example based on the feedback that specifies at least one of the subset of the previous results undesirably retrieved or the set of missing results undesirably omitted to automatically refine the previous version of the mixed query, wherein performing the programming by example based on the feedback generates the mixed query; and
executing the mixed query to retrieve results that match the pattern of the elements in the regular expression and satisfy the semantic constraint, wherein the results are retrieved from the database retained in the data repository; and
causing the results retrieved in response to executing the mixed query to be outputted.

2. The method of claim 1, wherein the first wildcard and the second wildcard are each one of a word wildcard or a phrase wildcard.

3. The method of claim 1, wherein the semantic constraint restricts the meaning of the match returned responsive to the first wildcard to one of a synonym of a given word, an antonym of the given word, a sense of the given word, or based on a negated semantic constraint.

4. The method of claim 1, wherein the first wildcard is a phrase wildcard, and wherein the semantic constraint restricts the phrase wildcard to return a name of a geographic location.

5. The method of claim 1, wherein the mixed query further comprises a syntactic constraint that restricts a grammatical construction of at least one of the first wildcard or the second wildcard.

6. The method of claim 1, wherein the elements in the regular expression comprise the explicit lexical constraint and the second wildcard, wherein the mixed query further comprises a second semantic constraint that includes a second restriction to a meaning of a match returned responsive to the second wildcard in the regular expression, and wherein the semantic constraint is a context-independent semantic constraint and the second semantic constraint is a context-dependent semantic constraint.

7. The method of claim 6, wherein executing the mixed query to retrieve the results that match the pattern of the elements in the regular expression and satisfy the context-independent semantic constraint and the context-dependent semantic constraint further comprises:
parsing the mixed query into the regular expression and semantic constraints, wherein the semantic constraints comprise the context-independent semantic constraint and the context-dependent semantic constraint;
expanding the context-independent semantic constraint into an expanded lexical constraint;
identifying candidate sentences from the database that include words specified by the expanded lexical constraint and the explicit lexical constraint;
filtering the candidate sentences from the database based on whether the candidate sentences match the pattern of the elements in the regular expression to output filtered candidate sentences from the database;
evaluating whether the filtered candidate sentences from the database satisfy the context-dependent semantic constraint; and
retrieving the filtered candidate sentences from the database that satisfy the context-dependent semantic constraint as the results.

8. The method of claim 7, further comprising applying the expanded lexical constraint and the explicit lexical constraint in an order from most restrictive lexical constraint to least restrictive lexical constraint to identify the candidate sentences from the database that include the words specified by the expanded lexical constraint and the explicit lexical constraint.

9. The method of claim 6, wherein the context-independent semantic constraint restricts the meaning of the match returned responsive to the first wildcard to one of a synonym of a first given word or an antonym of the first given word, and wherein the context-dependent semantic constraint restricts the meaning of the match returned responsive to the second wildcard to one of a sense of a second given word or based on a negated semantic constraint.

10. The method of claim 1, wherein the mixed query is a parameterized query.

11. The method of claim 1, wherein the results are utilized for at least one of interactive language tutoring or question answering.

12. A system that searches a database retained in a data repository, comprising:
a processor;
a memory that comprises computer-executable instructions that, when executed by the processor, cause the processor to perform acts including:
controlling a set of mixed queries outputted for an application, a particular mixed query in the set comprises a common regular expression and a variable constraint which is a function of the particular mixed query, the variable constraint is separate from the common regular expression in the particular mixed query, disparate mixed queries in the set comprise the common regular expression and differing variable constraints, the common regular expression is a pattern of elements, and the elements in the common regular expression comprise:
a first wildcard, wherein the variable constraint of the particular mixed query identifies the first wildcard in the common regular expression and includes a restriction to a meaning of a match returned responsive to the first wildcard; and at least one of an explicit lexical constraint or a second wildcard;

executing the set of the mixed queries to retrieve, from the database in the data repository, respective results that match the pattern of the elements in the common regular expression and satisfy the variable constraint for each of the mixed queries in the set; and utilizing the respective results for each of the mixed queries in the set for the application.

13. The system of claim 12, wherein the application is an interactive language tutoring application, wherein the memory further comprises computer-executable instructions that, when executed by the processor, cause the processor to perform acts including:

controlling the variable constraint to restrict the meaning of the match returned responsive to the first wildcard to be a particular word in a first mixed query in the set; and generating a sentence from the respective results corresponding to the first mixed query given the pattern of the elements and the particular word.

14. The system of claim 13, wherein the memory further comprises computer-executable instructions that, when executed by the processor, cause the processor to perform acts including:

controlling the variable constraint to restrict the meaning of the match returned responsive to the first wildcard to be an antonym of the particular word in a second mixed query in the set; and generating an incorrect alternative word for the sentence from the respective results corresponding to the second mixed query.

15. The system of claim 13, wherein the memory further comprises computer-executable instructions that, when executed by the processor, cause the processor to perform acts including:

controlling the variable constraint to restrict the meaning of the match returned responsive to the first wildcard to be inhibited from being a synonym of the particular word in a second mixed query in the set; and generating an incorrect alternative word for the sentence from the respective results corresponding to the second mixed query.

16. The system of claim 13, wherein incorrect alternative words are chosen from amongst words in a specific position within a set of sentences from the database, and wherein the incorrect alternative words are chosen based on the common regular expression and the variable constraint.

17. The system of claim 12, wherein the application is a question answering application, wherein the memory further comprises computer-executable instructions that, when executed by the processor, cause the processor to perform acts including:

controlling the variable constraint to restrict the meaning of the match returned responsive to the first wildcard to be a first word or phrase in a first mixed query in the set;

controlling the variable constraint to restrict the meaning of the match returned responsive to the first wildcard to be a second word or phrase in a second mixed query in the set;

determining a first answer associated with the first word or phrase from the respective results corresponding to the first mixed query; and determining a second answer associated with the second word or phrase from the respective results corresponding to the second mixed query.

18. A computer-readable storage device including computer-executable instructions that, when executed by a processor, cause the processor to perform acts including:

receiving an initial mixed query that comprises a regular expression and a set of constraints, the regular expression is a pattern of elements, and the set of constraints comprises semantic constraints;

executing the initial mixed query to retrieve results from a database that match the pattern of the elements in the regular expression and satisfy the set of constraints;

displaying the results on a display screen;

receiving feedback that specifies a subset of the results that are undesirably retrieved in response to the initial mixed query and a set of missing results that are undesirably omitted from the results retrieved in response to the initial mixed query;

automatically generating a refined mixed query by performing programming by example based on the feedback, wherein at least one of the regular expression or the set of constrains is refined responsive to the results to construct the refined mixed query;

executing the refined mixed query to retrieve updated results from the database that match the pattern of the elements in the regular expression and satisfy the set of constraints as refined; and displaying the updated results on the display screen.

19. The computer-readable storage device of claim 18, wherein the semantic constraints specify respective wildcards in the regular expression, and the semantic constraints include respective restrictions to corresponding meanings of matches returned responsive to the wildcards as specified.

20. The method of claim 1, wherein the semantic constraint is separate from the regular expression in the mixed query, and the semantic constraint includes an indicator that specifies that the restriction is for the first wildcard in the regular expression.

* * * * *